Nov. 14, 1967 P. J. BROWNSCOMBE 3,352,201
PROJECTOR VIEWER AND IMAGE SCANNING ASSEMBLY THEREFOR
Filed Oct. 8, 1965 2 Sheets-Sheet 1
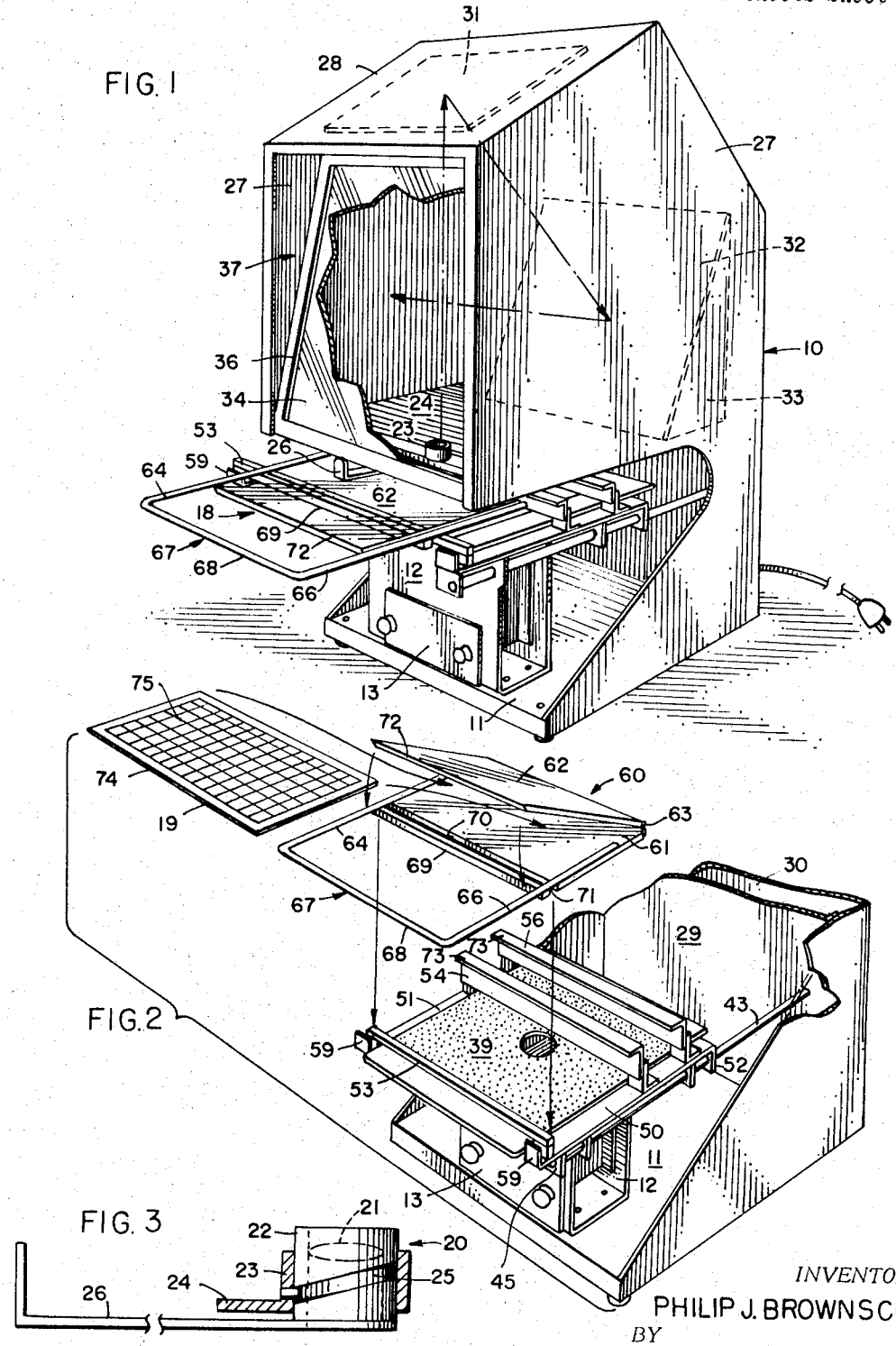
INVENTOR:
PHILIP J. BROWNSCOMBE
BY
Marzall, Johnston, Cook & Root
ATT'YS Nov. 14, 1967   P. J. BROWNSCOMBE   3,352,201
PROJECTOR VIEWER AND IMAGE SCANNING ASSEMBLY THEREFOR
Filed Oct. 8, 1965   2 Sheets-Sheet 2
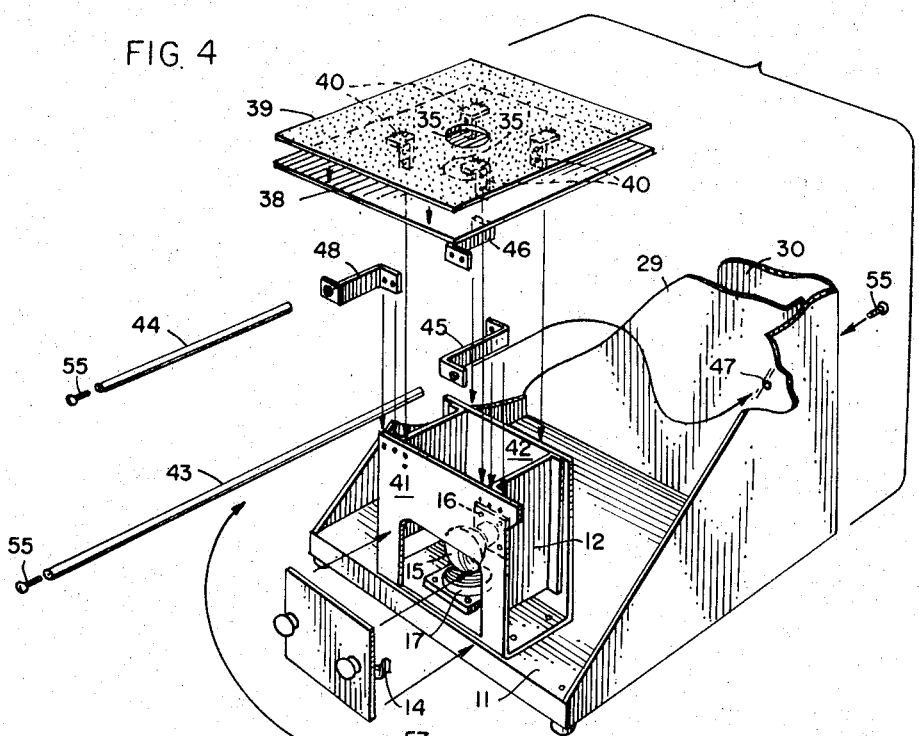
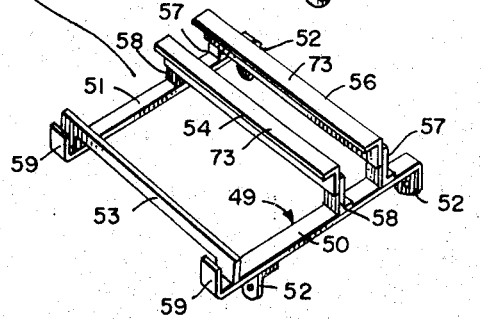
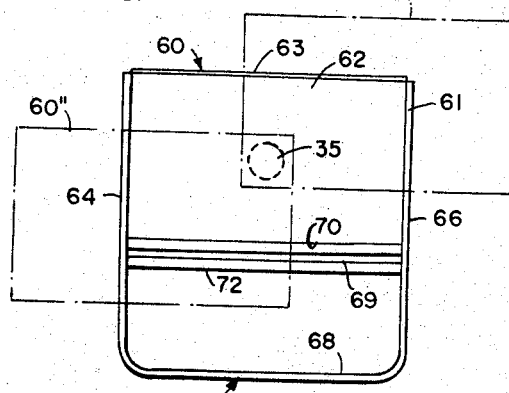
INVENTOR:
PHILIP J. BROWNSCOMBE
BY
Marzall, Johnston, Cook & Root
ATT'YS

United States Patent Office 3,352,201  
Patented Nov. 14, 1967

3,352,201  
PROJECTOR VIEWER AND IMAGE SCANNING ASSEMBLY THEREFOR  
Philip J. Brownscombe, Millington, N.J., assignor to Eugene Dietzgen Co., Chicago, Ill., a corporation of Delaware  
Filed Oct. 8, 1965, Ser. No. 494,213  
10 Claims. (Cl. 88—24)

This invention, in general, relates to apparatus useful in viewing of an image, and has more particular reference to improved apparatus for holding an image-containing sheet in a plane, to mechanism for moving said holding means in a plane in at least two different lineal directions, and to the projection of an image in said holding means onto a screen for the viewing or reading of the projected image.

The use of microfilm for the storage of copies of papers of a diverse nature in government and business records has grown significantly in the past decade. The microfilm reduces considerably the storage space in comparison with the storage space which would be required for the original records kept on the microfilm. However, the microfilm records cannot be studied without projecting them and enlarging them to a size sufficient for reading.

There has been a recurring demand for a simple viewing device or a reader which will permit a card carrying the microfilm record to be moved easily by one hand from frame to frame of the microfilm within a row or to move from one row of images to another. The viewing device or reader of this invention is designed to meet this demand. It is especially suitable for use with strip film in transparent jackets or for transparent film cards which consist of film sheets bearing a number of images in a rectangular pattern, either in a single row or two or more rows.

Briefly, the viewing device or reader of this invention comprises a light source which projects its light through a transparent holding means for the microfilm into a focusing lens. The image is reflected by a mirror system inside the cabinet of the projector viewer onto a self-contained screen. The projected image is enlarged to a size sufficient for direct reading on the screen.

The transparent holding means and the microfilm therebetween are movable from side-to-side and front-to-rear or rear-to-front, the purpose for which movement is to find and then read the desired frame or frames on the microfilm. It is important that the side-to-side and front-to-rear or rear-to-front movement be such that the microfilm remains substantially in the same horizontal plane. Otherwise, a focusing adjustment becomes necessary when scanning and/or reading various frames on the microfilm.

This invention provides a mechanically simple technique for supporting the transparent, microfilm-holding means so that the microfilm remains substantially in the same horizontal plane as it is moved from frame to frame. Heretofore, such support usually comprised rods or slides supporting the transparent, microfilm-holding means for side-to-side and front-to-rear or rear-to-front movement. Such rods or slides usually comprised one pair oriented in a front-to-rear direction and another pair oriented in a side-to-side direction.

It has been my experience that such rod or slide support mechanisms are difficult to align so that the microfilm remains in a substantially horizontal plane as it is moved. Furthermore, such bar or guide support is susceptible to misalignment by accidental jarring, bumping, or the like of the viewer or reader during shipment or during use.

This invention proposes that the microfilm be held between two flat, planar, relatively rigid transparent sheets, e.g., glass plates, the lower plate of which slidably rests on a horizontal plate or panel having a light-projection aperture therein. The upper, supporting surface of the plate or panel is covered with a pile fabric, the preferred form of which is a crush-proof velvet. The purpose for utilizing the pile fabric such as crush-proof velvet is to provide a surface which supports the lower, transparent sheet for relatively easy sliding movement thereon while also avoiding scratching of the lower surface of the transparent sheet. A velvet pile fabric has proven to be especially suitable for this purpose, both in terms of excellent wear qualities and in terms of anti-scratch qualities. Dirt or other grit which accidentally accumulates on the fabric pile does not scratch the transparent sheet because the dirt or grit falls to the lower portions of the pile and out of contact with the transparent member sliding thereon. This has been demonstrated by purposely spreading excessive quantities of gritty material on the velvet pile in much larger quantities than would accumulate in ordinary usage of a reader. A glass plate subsequently slid over the dirty pile showed no evidence of significant scratching.

With the lower of the transparent, microfilm-holding sheets resting flatly on the fabric pile, it may be moved from side-to-side and front-to-rear or rear-to-front for selecting the desired frame on the microfilm. For convenience of reading, it is desirable that the microfilm-holding sheets be guided in a manner so that twisting or rotation of the microfilm about a vertical axis is essentially avoided. Otherwise the frames do not maintain a proper orientation. For purposes of the latter, the transparent, microfilm-holding sheets have associated guide structures to prevent the latter from twisting or rotating during front-to-rear or rear-to-front and/or side-to-side movement. These guiding structures are arranged so that they guide the micro-film-holding sheets as aforedescribed without raising any portion thereof off the pile fabric support. Therefore, if these guide structures are or become slightly misaligned, the microfilm still remains in its desired horizontal plane during movement thereof.

It is, therefore, an important object of this invention to provide a projector viewer in which a part of the total image or a single frame of a multi-frame, image-containing sheet such as microfilm may be moved in a substantially uniform plane for selected viewing of said part or said frame in a projector viewer; a more specific object being to hold said image-containing sheet such as microfilm in a flat, substantially horizontal plane between two flat, planar, transparent holding sheets while supporting the latter on a pile fabric-covered, planar substantially horizontal support member; still another object being to provide a mechanism of the aforesaid character in which the pile fabric is velvet pile.

Another important object of the invention is to provide guide mechanism for the guiding of said transparent sheets with the microfilm or the like held flatly therebetween in a manner so as to prevent turning or rotation of said transparent sheets as they are moved from side-to-side and/or front-to-rear or rear-to-front while sliding the lower of the transparent sheets over the pile fabric with the lower surface always flatly resting on the pile fabric; another object being to provide mechanism for guiding the movement of the pile-supported transparent sheets in a manner whereby slight misalignment of the guiding mechanism does not disturb the movement of the microfilm or the like in a substantially constant plane.

Still another important object of the invention is to provide projector viewers in which the structures for supporting or moving microfilm and the like are relatively rugged structures which are not easily susceptible to misalignment; a further object of the invention being to provide a microfilm projector viewer or reader of relatively simple construction and relatively easy manufacture and assembly.

These and other advantages of the invention may be achieved by reader or viewing device construction following the generic principles of the invention herein described. These generic principles are illustrated in the specific embodiment of the invention as shown in the drawings wherein:

FIGURE 1 is a perspective view of the front of the embodiment with a portion of the screen broken away to facilitate illustration;

FIG. 2 is a perspective exploded view of a microfilm card divided into frames, the transparent holding means for said card, and the lower fragment of the reader embodiment of FIG. 1 in which is particularly illustrated the microfilm-holding sheet support and guide mechanism;

FIG. 3 is a broken, side elevation, partly in diametric section, of the focusing lens and the focusing adjustment therefor;

FIG. 4 is a perspective, exploded, detailed view of the lower fragment of the embodiment, illustrating particularly the details of the lamp housing and the mounting of the pile-covered support plate or panel on the lamp housing and the mounting of front-to-rear guide rods therewith;

FIG. 5 is a perspective view of the microfilm-holding, transparent sheet guide frame of the embodiment; and FIG. 6 is a diagrammatic top plan view illustrating the side-to-side and/or front-to-rear or rear-to-front movement of the microfilm-holding transparent sheets and the orientation thereof with the light projection aperture in the pile fabric-covered support plate or panel.

With reference to the drawings, the viewing device or reader comprises a cabinet 10 comprising a base 11 on which is mounted the lamp housing 12. The latter has a door 13 providing access for changing lamps 15. It may be of any suitable construction, and in the illustrated case is removably held over an opening in the front wall of lamp housing 12 by a pair of spring clips 14.

Referring to FIG. 4, the lamp housing has a lamp socket 16 on the rear wall which supports the lamp 15 over a concave mirror 17, which is mounted on the bottom wall of the lamp housing 12. The lamp and mirror project light upwardly through lamp housing 12 through a microfilm-holding and shifting mechanism 18, which is supported for movement in a horizontal plane (transverse to the vertical light beam from housing 12) across the top of lamp housing 12 by structures hereinafter described.

An image-containing sheet such as the microfilm card 19 divided into a series of rectangularly oriented frames is positioned in the path of the vertical light beam. After passing through a frame of the microfilm card 19, the light beam passes through a focusing lens 20. The focusing lens comprises, as shown in FIG. 3, a lens 21 supported in a cylindrical lens barrel 22. The lens barrel 22 is slidably and rotatably mounted in a cylindrical sleeve 23, which is rigidly supported on the bottom wall 24 of the closed, upper portion of cabinet 10. The focusing lens is movable up and down in sleeve 23 to obtain the desired focus for the projected image by virtue of the spiral groove 25 in the outer wall of the lens barrel 22. This spiral groove accommodates a pin projecting thereinto from the sleeve 23, whereby rotation of the lens barrel 22 by arm or handle 26 will cause the lens barrel 22 to move up or down in the sleeve 23.

The closed, upper portion of the cabinet 10 comprises side walls 27, a peaked top wall 28 and a rear, double wall comprising walls 29 and 30.

The light beam from focusing lens 21 strikes plane mirror 31 mounted on the underside of the front, sloping wall of top, peaked wall 28. It is reflected to plane mirror 32 mounted on brackets 33 on the rear wall and thence reflected forwardly onto the translucent screen 34. The screen 34 is mounted at an angle to the vertical in the frame 36 whereby the front portion of top wall 28 overhangs the screen and forms a light-shielding hood 37.

A planar, flat metal plate 38 is mounted across the top of lamp housing 12. It has an aperture 35' aligned with lens 21 to allow passage of the light beam therethrough. The upper surface of plate 38 is covered with a pile fabric 39, such as velvet pile, and has a corresponding, light-passage aperture 35. The fabric pile 39 may be affixed to the upper surface of plate 38 by any suitable means such as adhesive.

The plate 38 may be rigidly attached to the lamp housing 12 by angle brackets 40, which has one leg spot welded to the under surface of plate 38 and the other leg fixedly attached to the respective front wall 41 and rear wall 42 of lamp housing 12 by screws or the like.

A pair of rods 43 and 44 are positioned at opposite sides of the lamp housing 12. These rods are slide rods providing a sliding front-to-rear and rear-to-front sliding guide for the guide frame 49. The front end of rod 43 is mounted on the front wall 41 of housing 12 by the Z-bracket 45, which has one leg fixedly secured on front wall 41. A screw 55 extends through an aperture in the other leg of Z-bracket 45 and is threaded into the front end of rod 43, thereby rigidly mounting the front end of rod 43 on the Z-bracket 45. The rear end of slide rod 43 extends through an opening 47 in panel 29 of the rear wall and is rigidly attached by a similar screw 55 threaded into the rear end of rod 43 through an aperture (not shown) in panel 30 of the rear wall.

Another slide rod 44 is mounted by two Z-brackets 46 and 48, each respectively having one leg attached to rear wall 42 and front wall 41 of housing 12. The respective ends of rod 44 are mounted by screws 55 in the other leg of brackets 46 and 48 as previously described with respect to bracket 45.

The slide frame 49 comprises a pair of spaced, side bars 50 and 51. Side bar 50 has a pair of downwardly depending ears 52 containing apertures sufficiently large to slidingly receive slide rod 43 while side bar 51 has a single, similar ear 52 on the rear end thereof slidably supported on rod 44. Frame 49 is thus slidably tripod-supported on rods 43 and 44 by the apertured ears 52 and side bars 50 and 51.

The frame 49 further comprises a front guide bar 53 extending between the front portions of side bars 50 and 51. A pair of rear guide channels 54 and 56 extend between rearward portions of side bars 50 and 51. The rear guide channel may be fixedly mounted by L-brackets 57 while the other guide channel 54 is mounted on L-brackets 58, which preferably are removably attached to side bars 50 and 51 by screws or the like (not shown). The purpose in providing two guide channels 54 and 56 is to accommodate two different sizes of transparent microfilm-holding plates such as plates 61 and 62 in the slide frame 49. Channel 54 is used when the smaller of the two sizes is mounted on the slide frame, and it is removed if the larger of the two sizes of transparent microfilm-holding plates 60 and 61 are employed, whereby the rear channel 56 is used as the channel for the larger size. The forward ends of side bars 50 and 51 each may have an upstanding ear 59 spaced forwardly of the front guide bar 53. Thus, slide frame 49 is slidably mounted for front-to-rear and rear-to-front movement on slide rods 43 and 44 with front guide bar 53 and guide channels 54 and 56 passing over and out of contact with the pile fabric covering 39 on plate 38.

A transparent plate, microfilm holder 60 comprises a planar, lower, transparent plate 61, e.g., a flat glass plate, and a shorter but wider planar, upper, transparent plate 62, e.g., a second flat glass plate. The rear edges of plates 61 and 62 are hinged together for relative pivotal movement by a suitable hinge, e.g., a flexible fabric strip hinge 63, secured to the rear edge portions of plates 61 and 62. The lower plate 61 lies flat on the pile fabric covering 39 of plate 38 so that plates 61 and 62 and the microfilm member 19, held flatly therebetween when the plates are closed, respectively move in a uniform plane essentially transverse to the path of the light beam through apertures 35 and 35'. This maintains an essentially constant focus for the projected image as the plates and the microfilm therebetween are shifted for reading of a selected frame or frames of the microfilm member 19.

The movement of plates 61 and 62 in the horizontal plane is a manual movement facilitated by a U-bar handle 67 having respective legs 64 and 66 attached to the respective side portions of lower plate 61. The cross bar 68 of U-bar handle 67 may be grasped to push or pull the film holder unit 60 in the desired direction. The film holder unit 60 is prevented from twisting during such manual movement by having front edge 70 of lower plate 61 and rear face of guide bar 69 in slidable, guiding contact against the opposing faces of front guide bar 53 of slide frame 49.

It has been found that it is advantageous to provide on the film holder 60 the guide bar 69 spaced forwardly from the front edge 70 of lower plate 61 a distance sufficient to accommodate therebetween the front guide bar 53. Front guide bar 53 and the front edge 70 serve as sliding guides for side-to-side sliding movement of the transparent plate, microfilm holder 60. Thus, front edge 70 of lower plate 61 and the rear face of guide bar 69 form a channel or space 71 slidably accommodating the front guide bar 53 of the slide frame 49 to guide side-to-side, sliding movement of the lower plate 61 over the pile fabric covering 39, on which the lower plate rests flatly in all positions to which it is shifted.

The rear guide channels 54 and 56 each have a forwardly projecting, upper lip 73 which serves as an abutment stop in the event of accidental downward striking of the handle 67, without which abutment stop the film holder 60 might be damaged by either falling off the slide frame 49 or by striking of the rearward portion thereof against the under side of bottom wall 24.

As aforedescribed, the upper plate 62 is shorter and wider than the lower plate 61. The shorter dimension is needed in order that the respective ends of plate 62 fit between the segments of legs 64 and 66 which lie on the upper surface along the outer edges of plate 61. The wider dimension provides an overhanging lip 72 on the upper plate 62 so that it may be finger-lifted for insertion or removal of the microfilm member 19.

FIG. 6 illustrates diagrammatically three different orientations of the transparent plate, microfilm-holding unit 60. The position shown in full lines is the position with the light beam aperture 35 approximately centered in the unit 60. The position 60' in phantom lines shows the orientation wherein the light beam is projected through one of the corner portions, while the position 60" shows in phantom lines the orientation wherein the light beam is projected through the opposite corner portion. In any orientation of the microfilm-holding unit 60 on the fabric pile covered support plate 38, the lower plate 61 always rests flatly on the fabric pile 39. The guiding members aforedescribed are dimensioned so that they do not raise any portion of the film holding unit 60 from its flat, sliding support on the pile fabric 39. The sliding guide members function only to allow front-to-rear, rear-to-front, side-to-side or diagonal movement of the microfilm-holding unit 60 by manual manipulation of handle 67 without turning or rotation about a vertical axis of the unit 60. The pile fabric covering 39 provides an essentially scratch-free support for the lower transparent plate 61 so that its surface is not optically degraded by abrasion or scratching during the aforesaid sliding movement.

Ordinarily the pile fabric-covered support plate will be substantially horizontal, and the light beam will be projected therethrough substantially at a right angle to the plane of said plate. It is, of course, possible to depart from these norms, and it is within the contemplation of the invention that the pile fabric-covered plate lie at an acute angle to the horizontal and/or that the light beam projection be other than vertical. It is further contemplated that the upwardly directed light beam of the illustrated, preferred embodiment be a downwardly-directed light beam with the focusing lens and beam-folding devices, e.g., plane mirrors, prisms, etc., appropriately located to project the image onto a screen or the like. Still further, in the broad aspects of the invention, the upper glass plate 62, though preferred, may be omitted if microfilm member 19 will lie flat on lower, transparent plate 61, or it may be replaced by any other light-transmitting member such as an open frame, clips, etc., adapted to press against a frame portion 74 about the microfilm 75 to hold the microfilm member 19 flatly on the upper surface of flat plate 61.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A projector comprising means for projecting a light beam, a flat plate extending across the path of said light beam, a pile fabric covering on a flat surface of said plate, a light-transparent, flat plate having one flat surface resting flatly on said covering, the opposite flat surface of said transparent plate adapted to support an image-containing sheet flatly thereon, said first-mentioned flat plate and said covering having an aperture for passage of said light beam therethrough, and means for sliding said light transparent plate over said covering for aligning a selected portion of said image-containing sheet with the light beam projected through said aperture.

2. A projector comprising means for projecting a light beam substantially vertically, a support member extending across the path of said light beam, the upper surface of said member being a flat surface and being covered by pile fabric cover, a light-transparent, flat plate having a lower, flat surface resting on the pile of said fabric, said support member and said cover having an aperture for passage of said light beam therethrough. and the upper, flat surface of said plate adapted to support an image-containing sheet flatly thereon, whereby said plate with said image-containing sheet may be slid on said pile to align a selected portion of said image with the light beam projected through said aperture.

3. A projector as claimed in claim 1 wherein said pile fabric cover is velvet.

4. A projector as claimed in claim 2 wherein said pile fabric cover is velvet.

5. A projector viewer comprising a horizontal base member, a lamp housing on said base member, a flat, horizontal plate extending across the top of said housing, a pile fabric cover on the upper surface of said plate, said plate and cover having an aperture therethrough, means in said housing for projecting a light beam upwardly through said aperture, a lower, light transparent, flat plate resting flatly on the pile of cover, an upper, light-transparent, flat plate extending over said lower plate, said upper and lower plates adapted to hold a microfilm member flatly therebetween, and means above said plates for projecting the image of said microfilm member onto a screen.

6. A projector viewer as claimed in claim 5, a pair of parallel slide rods extending horizontally along opposite sides of said housing, a guide frame, means slidably mounting said guide frame on said rods, a straight, horizontal lip on said one of said guide members slightly to said rods and slightly above said cover, and a straight edge on said transparent plates in sliding, guiding contact with said guide member.

7. A projector viewer as claimed in claim 6, said frame having two, horizontally spaced, horizontal, straight guide members extending transversely to said slide rods and slightly above said cover, and parallel straight edges on opposite sides of said lower, light-transparent plate in sliding, guide contact with respective guide members.

8. A projector viewer as claimed in claim 7, a straight edge on said upper plate, a fabric strip hinging together said plates along said straight edge of said upper plate and one of said straight edges of said lower plate, said strip being in sliding, guiding contact with one of said guide members, the other of said guide members being a straight bar in sliding, guiding contact with the other straight edge of said lower plate, and the portion of said upper plate opposite said fabric strip hinge projecting beyond said lower glass plate and said bar to provide a lip for lifting said upper plate relative to said lower plate for inserting or removing a microfilm member between said last-mentioned plates.

9. A projector viewer as claimed in claim 8, a horizontal lip on said one of said guide members slightly above said hinged edges of said plates.

10. A projector as claimed in claim 5 wherein said pile fabric cover is velvet.

References Cited

UNITED STATES PATENTS

| | | | |
|---|---|---|---|
| 2,701,979 | 2/1955 | Pratt et al. | 88—24 |
| 3,072,013 | 1/1963 | Pratt | 88—24 |
| 3,175,461 | 3/1965 | Brownscombe | 88—24 |
| 3,188,910 | 6/1965 | Brownscombe et al. | 88—24 |
| 3,267,801 | 8/1966 | Abott et al. | 88—24 |

NORTON ANSHER, *Primary Examiner.*

R. M. SHEER, *Assistant Examiner.*

UNITED STATES PATENT OFFICE
CERTIFICATE OF CORRECTION

Patent No. 3,352,201  November 14, 1967

Philip J. Brownscombe

It is certified that error appears in the above identified patent and that said Letters Patent are hereby corrected as shown below:

Column 6, lines 69 and 70, "lip on said one of said guide members slightly" should read -- guide member on said frame extending transversely --.

Signed and sealed this 13th day of January 1970.

(SEAL)
Attest:

M. Fletcher, Jr.
Attesting Officer

WILLIAM E. SCHUYLER, JR.
Commissioner of Patents